US006773643B2

(12) United States Patent
Beitelshees et al.

(10) Patent No.: US 6,773,643 B2
(45) Date of Patent: Aug. 10, 2004

(54) CONTINUOUS METHOD FOR FORMATION OF THREE DIMENSIONAL BURLS IN A SOLID SURFACE MATERIAL

(75) Inventors: Carl P. Beitelshees, Lockport, NY (US); Rolf Thomas Weberg, East Auroa, NY (US); Shitong Zhu, Amherst, NY (US); Elizabeth R. Walter, Wheatfield, NY (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 93 days.

(21) Appl. No.: 10/244,197

(22) Filed: Sep. 16, 2002

(65) Prior Publication Data

US 2003/0071387 A1 Apr. 17, 2003

Related U.S. Application Data

(63) Continuation-in-part of application No. 09/682,758, filed on Oct. 15, 2001, now abandoned.

(51) Int. Cl.[7] .................. B29C 39/20; B29C 39/12; B29C 43/20; B29C 43/30
(52) U.S. Cl. .................. 264/73; 264/74; 264/75; 264/245; 264/319; 523/171; 524/423; 524/425; 524/444; 427/263; 427/268; 427/274
(58) Field of Search .................. 264/73, 74, 75, 264/245, 319, 31; 523/171; 524/423, 425, 444; 427/263, 268, 274

(56) References Cited

U.S. PATENT DOCUMENTS

| 3,230,284 | A | | 1/1966 | Iverson et al. ................ 264/73 |
|---|---|---|---|---|
| 3,341,396 | A | | 9/1967 | Iverson et al. ............... 428/142 |
| 3,488,246 | A | * | 1/1970 | Duggins ....................... 428/15 |
| 3,562,379 | A | * | 2/1971 | Duggins ....................... 156/61 |
| 3,570,056 | A | | 3/1971 | Hall et al. ..................... 425/86 |
| 3,670,060 | A | * | 6/1972 | Cuffaro et al. ................ 264/77 |
| 3,706,825 | A | * | 12/1972 | Hall et al. ..................... 264/75 |
| 3,816,155 | A | | 6/1974 | Iverson et al. ............... 428/151 |
| 3,904,791 | A | | 9/1975 | Iverson et al. ............... 427/277 |
| 3,906,065 | A | * | 9/1975 | Schneider et al. ......... 264/40.1 |
| 4,159,301 | A | | 6/1979 | Buser et al. ........... 264/331.15 |
| 4,643,921 | A | * | 2/1987 | Terabe et al. ................. 428/15 |
| 4,710,333 | A | | 12/1987 | Murakami et al. ............ 264/73 |
| 4,721,634 | A | * | 1/1988 | McKinnon .................... 427/263 |
| 5,055,324 | A | | 10/1991 | Stecker ....................... 427/281 |
| 5,260,006 | A | | 11/1993 | Scher et al. ................ 264/491 |
| 5,444,115 | A | | 8/1995 | Hu et al. ..................... 524/437 |
| 5,820,799 | A | | 10/1998 | Barnett ........................ 264/73 |
| 6,011,101 | A | | 1/2000 | Barnett ....................... 524/430 |
| 6,077,575 | A | * | 6/2000 | Minghetti .................... 428/15 |
| 6,462,103 | B1 | * | 10/2002 | Beitelshees et al. ........ 523/171 |

* cited by examiner

*Primary Examiner*—Michael Colaianni
*Assistant Examiner*—Michael I. Poe

(57) ABSTRACT

A series of three-dimensional burls are formed in a filled-acrylic solid surface material by curing partially mixed steams of acrylic resin casting compositions with defined parameters of viscosity, density and surface tension.

7 Claims, No Drawings

CONTINUOUS METHOD FOR FORMATION OF THREE DIMENSIONAL BURLS IN A SOLID SURFACE MATERIAL

RELATED APPLICATION

The present application is a continuation-in-part of Ser. No. 09/682,758 filed Oct. 15, 2001 now abandoned.

BACKGROUND OF THE INVENTION

The present invention is directed to a continuous process for forming burls in a solid surface material comprising a filled acrylic composition exhibiting a series of burls present on the surface of the material.

The formation of different surface appearances in a solid surface material such as used for countertops and sinks is well known in the prior art.

Iverson, U.S. Pat. No. 3,816,155, discloses a method for producing protective coatings in simulation of wood graining. The method comprises preparing a plurality of portions of thixotropic viscous settable resins colored with metallic pigments in different colors. These separate portions of vehicle are combined with a minimum of admixing, either in a common container from which the mixture is applied to a base surface, or by spreading the several vehicle portions onto a base. The applied coating mixture is allowed to level or is leveled into a relatively uniform layer. While liquid and viscous, the leveled coating is furrowed to develop a lined pattern therein in simulation of wood graining. The coating is permitted to set up and harden and may be formed on a non-adhering surface from which it is stripped as a self-sustaining film.

Iverson, U.S. Pat. No. 3,904,791 also discloses a method for producing protective coatings in simulation of wood graining, leather, and like effects such as sandblasted graining, distressed wood graining, burled graining, elephant hide leather may be obtained by variations of the basic method. The resin may be cast in slabs or blocks of substantial thickness from which veneer layers may be removed.

Murakami, et al., U.S. Pat. No. 4,710,333 provide teachings for a continuous process in formation of synthetic resin plates having an irregular flow pattern of different colors.

Stecker, U.S. Pat. No. 5,055,324 prepares synthetic surfaces having a pattern simulating stone, marble and other natural substances by combining a resin matrix with a veining pigment composition with a specific gravity heavier than the resin system. In addition, a blooming agent component is employed with a specific gravity less than the resin system.

Barnett, U.S. Pat. No. 6,011,101, discloses a process for making a marble casting material by partial intermingling of two or more partially incompatible marble casting resins that are not intended to be normally used in combination.

A need is present in solid surface materials for varying surface appearances which extend into the interior of such materials.

SUMMARY OF THE INVENTION

The present invention is directed to a continuous method of incorporating a burl appearance into solid surface material comprising the steps of:

a) forming two separate acrylic resin suspension streams with a first stream having
   i) a viscosity in a range from 500 to 3,000 centipoise,
   ii) a density in a range from 1.5 to 1.7 grams per milliliter and
   iii) a surface tension in a range from 35 to 45 dyne per centimeter and
a second stream having
   i) a viscosity in a range from 500 to 3,000 centipoise and
   ii) a density in a range from 1.6 to 1.8 gram per milliliter with the proviso that the second stream has a density of at least 0.05 gram per milliliter more than the first stream and the second stream has a surface tension of at least 0.5 dyne per centimeter greater than the first stream and
b) continuously feeding one of the streams into a mixing chamber
c) continuously injecting one of the streams into the other stream within the mixing chamber wherein partial mixing takes place
d) flowing the partially mixed streams onto a support
e) curing the two suspensions whereby a series of three-dimensional burls are formed.

DETAILED DESCRIPTION OF THE INVENTION

In the present invention, it is required that a series of burls are formed in a solid surface material comprising a cured mineral-filled acrylic resin.

As employed herein, a "burl" is employed in its normal meaning but is applied to a material other than wood. Thus, the solid surface material will have a burl appearance. As set forth in The Random House Dictionary of the English Language (Unabridged Dictionary) Copyright 1967, a burl means "a" dome-shaped growth on the trunk of a tree. In accordance with this definition a series of burls are in a three dimensional configuration in the solid surface material and, ignoring coloration, have a tree-like growth appearance. However, since a surface of the material is two-dimensional (ignoring edge portions), the surface will comprise a series of burl cross-sections.

However, it is understood that the burls may be in any color, or series of colors, and in many instances will not resemble wood solely due to coloration. In similar fashion as burls on a tree with different shadings of color, the burls in the solid surface material will have different shades of the same color, or entirely different colorations. For purposes of illustration, different shades of white can be employed which present a unique appearance compared to coloration of a tree. Of course, a wood-like product such as with different shades of brown can be formed in the solid surface material to mimic or resemble a wood product.

As employed herein, a solid surface material is employed in its normal meaning and represents a three dimensional material such as a material particularly useful in the building trades for kitchen countertops, sinks and wall coverings wherein both functionality and an attractive appearance are necessary.

This invention is directed to a thermoset casting composition which is comprised of two or more individual casting compositions which are partially mixed prior to cure. In general, the casting compositions described are composed of a liquid polymerizable fraction, an optional noncrosslinked polymer fraction, and a solid fraction. Also included are cure agents, pigments and additives.

Liquid polymerizable fraction: The liquid polymerizable fraction is a liquid starting material. By "liquid" is meant that the material is fluid at room temperature. The liquid polymerizable material may include one or more of the following: (a) at least one monofunctional monomer reactive material; (b) at least one polyfunctional monomer reactive material, and (c) at least one oligomeric reactive material.

Monofunctional monomer reactive material: a "monofunctional monomer reactive material" refers to a compound having one unit of unsaturation capable of taking part in a free radical initiated polymerization reaction, thus becoming incorporated into a polymeric chain. Suitable monofunctional monomer reactive materials can include, for example, monomers having one acrylic group, monomers having one vinyl group, monomers having one allyl group, substituted butadienes or combinations thereof.

A preferred type of monofunctional monomer reactive material is an ester of acrylic or methacrylic acid. The ester is generally derived from an alcohol having 1–20 carbon atoms. The alcohols can be aliphatic, cycloaliphatic or aromatic. The ester may also be substituted with groups including, but not limited to, hydroxyl, halogen, and nitro. Representative (meth)acrylate esters include methyl (meth)acrylate, ethyl (meth)acrylate, butyl (meth)acrylate, 2-ethylhexyl (meth)acrylate, glycidyl (meth)acrylate, cyclohexo(meth)acrylate, isobornyl(meth)acrylate, siloxane (meth)acrylates, and the like. Acrylic and methacrylic acid can also be used. Most preferred is methylmethacrylate and copolymers thereof.

Examples of monofunctional monomer materials including one "vinyl group" include acrylonitrile, methacrylonitrile, and vinyl acetate.

Polyfunctional monomer reactive material: a "polyfunctional monomer reactive material" refers to a monomeric compound having multiple units of unsaturation which can take part in free radical initiated polymerization reactions, thus becoming incorporated into two or more polymeric chains. By the nature of the resulting structure, such a reaction is referred to as "crosslinking" in which two or more polymeric chains are joined by the polyfunctional monomer reactive material. As such, polyfunctional monomer reactive materials are often referred to as crosslinking agents.

The reactive group can be one that copolymerizes with the liquid polymerizable material, such as a polymerizable ethylenically unsaturated group. The reactive group can also be one that reacts with a side chain or residue of the liquid polymerizable material after polymerization, such as a hydroxyl, carboxyl, isocyanate or epoxy group. The reaction of the multifunctional reactive material forms a crosslinked network with the liquid polymerizable material.

A preferred class of crosslinking agents is the (meth)acrylate esters of polyols. Some representative examples include ethylene glycol di(meth)acrylate, neopentyl glycol di(meth)acrylate, hexanediol di(meth)acrylate, trimethylolpropane tri(meth)acrylate, pentaerythritol tri(meth)acrylate, dipentaerythritol tetra(meth)acrylate, and the like. Other suitable types of crosslinking agents include divinyl compounds, such as divinyl ethers, allyl (meth)acrylate, urethane di- and poly-(meth)acrylates.

Oligomeric reactive material: an "oligomeric reactive material" refers to an oligomeric, low molecular weight chain having one or more units of reactivity, such as ethylenic unsaturation, that can take part in free radical initiated polymerization reactions, thus becoming incorporated into a polymeric material. Oligomeric reactive materials can include oligomers of any of the (a) and/or (b) monomers described above; urethane (meth)acrylates formed by (meth)acrylic functionalization of urethane oligomers or by in situ reaction of oligomeric isocyanates with (meth)acrylic residues; (meth)acrylate functionalized unsaturated polyester oligomers and resins; epoxy (meth)acrylates, such as the mono- and di(meth)acrylates of bisphenol A epoxy resins; and combinations thereof. Preferably, the oligomeric reactive material is incorporated into the polymerized material making up the cast article during the curing process. Alternative reactive groups can be vinyl, allyl, and the like. Reactive groups can be pendant to or in the main chain of the polymer.

It is understood that oligomeric reactive materials having more than one reactive group can also function as crosslinking agents.

It will be appreciated that the choice of reactive materials making up the liquid polymerizable fraction will depend to some extent on the desired properties of the final molded article. For example, if adhesion to a hydrophilic filler or substrate is desired, an acrylic material with acid or hydroxyl groups can be used. For flexibility, (meth)acrylates with lower glass transition temperature, $T_g$, such as butyl acrylate, can be used. For thermal stability, it is preferred that acrylates be used in combination with methacrylates. For enhanced hardness, it is preferred that high $T_g$ (meth)acrylate functional oligomer be used.

Non-crosslinked Polymer Fraction: The casting compositions of the present invention optionally include at least one non-crosslinked resin polymer. Non-crosslinked resin polymers of the present invention can be reactive, nonreactive or a combination thereof. A non-crosslinked resin polymer is "reactive" when the polymer physically associates or chemically reacts with any other component(s) in the casting composition.

The term "non-crosslinked" as used herein refers to polymers that are linear, branched, blocked or combinations thereof, that, as a starting material prior to introduction to the molding composition have chains without linkages between the chains. The non-crosslinked polymer can either be soluble or insoluble in the liquid polymerizable material. It is preferred that the non-crosslinked polymer is soluble in the liquid polymerizable material. The combination of the soluble non-crosslinked polymer dissolved in the liquid polymerizable material is generally referred to as a "sirup". Suitable polymers include, are but not limited to, homopolymers and copolymers made from any of the monomers or oligomers listed above as liquid polymerizable material.

The primary use of the non-crosslinked polymer fraction is as a rheology modifier for the casting composition, particularly when soluble in the liquid polymerizable fraction. In addition, the non-crosslinked polymer fraction can also contribute to the performance and/or aesthetics of the final cast article and can reduce the amount of liquid polymerizable fraction required.

Solid Fraction: The casting composition of the present invention optionally includes at least one filler. Suitable types of fillers useful in the present molding composition include, for example, mineral fillers, decorative fillers, and functional fillers.

The mineral filler increases the strength of the final cast material. It will be understood, that in addition to strength, the mineral filler can provide other attributes. For example, it can provide other functional properties, such as flame retardance, or it may serve a decorative purpose and modify the aesthetics. Any mineral filler known in the field of acrylic solid surfaces can be used in the present casting composition. Some representative mineral fillers include alumina, alumina trihydrate (ATH), alumina monohydrate, Bayer hydrate, silica including sand or glass, glass spheres, magnesium hydroxide, calcium sulfate, calcium carbonate, barium sulfate, and ceramic particles. ATH, alumina monohydrate, magnesium hydroxide, and calcium carbonate are known to have fire retardant properties when used in solid surface applications. ATH is a preferred fire retardant filler. Combinations of mineral fillers can also be used. The mineral filler is generally present in the form of small particles, with an average particle size in the range of from about 5–200 microns.

The nature of the mineral filler particles, in particular, the refractive index, has a pronounced effect on the aesthetics of the final molded article. When the refractive index of the filler is closely matched to that of the liquid polymerizable material after polymerization, the resulting molded article has a translucent appearance. As the refractive index deviates from that of the polymer matrix after polymerization, the resulting appearance is more opaque. The index of refraction of ATH is very close to that of poly methylmethacrylate (PMMA), and frequently ATH is a preferred filler for PMMA systems. For other polymer/filler systems, the refractive indices can be adjusted to provide the desired appearance.

The mineral filler, when present, is generally present in an amount of from about 10 to about 75% by weight, based on the total weight of the casting composition; preferably about 40 to about 70% by weight.

The casting composition can optionally include decorative fillers. Such fillers, although they may have a minor effect on physical properties, are present primarily for aesthetic reasons. Examples of suitable decorative fillers include larger particles of unfilled and filled crosslinked or uncrosslinked polymeric material. Such materials generally have a particle size of from about 325 to about 2 mesh (0.04–10.3 mm in greatest average dimension) and can be, for example, pigmented PMMA particles filled with ATH. Other types of decorative fillers include: pigments and dyes; reflective flakes; micas; metal particles; rocks; colored glass; colored sand of various sizes; wood products such as fibers, pellets and powders; and others. The decorative filler can be present in an amount of from 0 to about 20% by weight, based on the total weight of the casting composition; more typically, about 1 to about 15% by weight.

The molding composition can optionally include functional fillers. Such fillers impart additional special properties for specific applications. Examples of such functional fillers include flame retardants, antibacterial agents, release agents, and others known in the art. The functional fillers, when used, are present in an amount sufficient to be effective, but generally no greater than about 25% by weight, based on the total weight of the molding composition.

The total amount of fillers present in a molding composition is generally from about 1–80% by weight, and preferably from about 40–70% by weight, based upon the total weight of the composition.

Cure Agents: Cure agents, when activated, generate free radicals which then initiate the desired polymerization reactions. Either a chemically-activated thermal initiation or a purely temperature-driven thermal initiation to cure the acrylic polymerizable fraction may be employed herein. Both cure systems are well known in the art. In this embodiment, generally, a chemically-activated thermal initiation cure is employed.

Pigments: Pigments such as iron oxides, zinc sulfide, zinc oxide, and titanium dioxide are routinely utilized in solid surface applications to achieve the desired color and aesthetics. These may be added in the form of liquid dispersions or pastes or as neat, milled solids depending upon the needs of the particular system.

In the present embodiment, pigments are added to also adjust the density, viscosity and surface tension of the various casting compositions.

Additives: Other ingredients are included in the casting compositions to enhance physical performance, improve processability, or adjust visual aesthetics. Examples of such additives include the addition of adhesion promoting agents to increase adhesion between the filler and the polymerizing fraction. Impact modifiers, for example, elastomeric polymers such as graft copolymers of methyl methacrylate, styrene, and butadiene, copolymers of butyl acrylate and methyl acrylate or other well known impact modifiers can be added to improve impact strength. Flame retardant additives such as brominated organics can be incorporated. Other flame retardants include carbon fiber and aramid fiber as disclosed in U.S. Pat. No. 5,444,115.

Furthermore, it is permissible to include in the casting compositions of this invention, controlled amounts of additives such as parting agents, fluidizing agents, viscosity control agents antioxidants, and the like as are known to those of ordinary skill in the art in amounts that do not detract from physical performance, flame retardant attributes, or aesthetics of the products of this invention. It must be noted that use of surfactants, oils, waxes, or paraffins is not necessary to obtain the three dimensional burl aesthetic, but can be employed if needed.

Critical to the formation of the burl aesthetic is the use of at least two separate, filled acrylic casting compositions. The character of the acrylic polymer matrix in the two suspension streams may be the same or different provided the viscosity, density and surface tension requirements are present. A first filled-acrylic casting composition, used as the matrix, has a viscosity in a range from 500 to 3,000 centipoise, a density in a range of 1.5 to 1.7 grams per milliliter and a surface tension in a range from 35 to 45 dyne per centimeter.

The measurement for viscosity is in accordance with test known to those skilled in the art, such as the rotating spindle procedure, or by the measurement of the flow of the fluid compared to a known standard, the flow being inversely proportional to its viscosity. A preferred measurement employs a Brookfield viscometer at 60 rpm using spindle 4, after the viscometer had run 30 seconds.

The measurement for surface tension is in accordance with ASTM procedure D-971. The static surface tensions were measured in the examples employed using a du Nouy ring method well known to those having ordinary skill in the art.

At least one, second, filled-acrylic casting composition, used as the vein, has a viscosity in a range from 500 to 3,000 centipoise and a density in a range from 1.6 to 1.8 gram per centimeter. These criteria can also be applied to multiple vein casting compositions.

However, for a burl formation it is necessary for the vein casting composition to have a density of at least 0.05 gram per millimeter more than the matrix casting composition. Also, all vein casting compositions have a surface tension of at least 0.5 dyne per centimeter greater than the first.

Combining of the matrix and vein casting compositions can be by simple hand mixing, e.g. use of a paddle, or mechanical mixing with a requirement that only partial mixing of the compositions takes place. A non-homogenous mixture is critical to allow the burling effect to take place during curing and solidification of the two suspensions.

In the present invention a continuous process is employed in formation of solid surface articles. A preferred technique in a continuous process is to inject one or more streams of one or more of the vein casting compositions into an interior portion of a stream of the matrix casting composition through use of one or more injector nozzles.

In the continuous process, conventionally the final article is present as a sheet and accordingly a support is necessary for application of at least two partially mixed streams. Typically a mixing chamber is utilized wherein one casting composition stream is introduced and can constitute a major portion, the matrix, of the final solid surface material. Other casting composition streams, as referenced above, are typically injected prior to transport of the stream to a support for curing and solidification. Although a single injector nozzle can be employed, the burl aesthetic pattern complexity can be adjusted by use of more than one nozzle.

As previously set forth, a chemically-activated thermal cure of the matrix and veins filled-acrylic casting compositions is preferred. Preferably both casting compositions will cure at the same rate. However, identical cure rates are not necessary. For convenience the first and second suspensions should cure at a rate within one minute of one another.

It is understood in the present invention that although three dimensional burls are present in interior portions of the solid surface material, surface sanding of the material may be desirable to obtain an optimum surface appearance dramatizing the series of burls. Also, pleasing aesthetic appearance can be dramatized by a choice of colors which can be the same or different for the two or more casting composition streams. Illustratively, the colors may be the same, such as shades of white on white or shades of brown on brown. An example of different colors is a white and brown introduced in the first and second casting compositions respectively.

In the following examples, all parts and percentages are by weight and degrees in centigrade unless otherwise indicated.

EXAMPLE 1 a white on white acrylic solid surface sample was prepared employing a continuous process by first preparing a matrix suspension consisting of 16.1 parts by weight of an acrylic polymer solution comprised of 23 parts acrylic polymer resin of molecular weight approximately 120,000 dissolved in methyl methacrylate monomer. This solution was then further diluted with 16.9 parts by weight of methyl methacrylate monomer. To this dilute solution were added 0.42 parts by weight ethylene glycol dimercapto acetate, 0.28 parts 2-hydroxy ethyl methacrylate acid phosphate and 0.14 parts polyoxyethylene alkyl ether phosphate. Alumina Trihydrate was then slurried into this mixture at 58. parts by weight, along with Magnapearl® 1000 accenting mica at 2.38 parts by weight and a 55 part by weight slurry of ZnS pigment in epoxidized soybean oil is added at 0.08 parts by weight. This suspension was measured to have a viscosity of 1410 cps, a density of 1.65 g/ml and a surface tension of 36.0 dyne/cm.

A vein suspension was prepared using 5.9 parts by weight of an acrylic polymer solution comprised of 23 parts acrylic polymer resin of molecular weight approximately 120,000 dissolved in methyl methacrylate monomer mixed with 20.85 parts by weight methyl methacrylate monomer. To this solution were added 0.35 parts by weight ethylene glycol dimercaptoacetate, 0.29 parts calcium hydroxide dispersion made up of 41% calcium hydroxide, 42% dioctyl terephthalate, and 17% KER 828 epoxy resin liquid, 0.28 parts 2-hydroxy ethyl methacrylate acid phosphate and 0.14 parts polyoxyethylene alkyl ether phosphate. Titanium dioxide solid was then slurried into this mixture at 15 parts by weight, along with alumina trihydrate at 52 parts by weight, Magnapearl® 1000 accenting mica at 1.4 parts by weight, a 55 parts by weight slurry of ZnS pigment in epoxidized soybean oil is added at 2.4 parts by weight and a 15 parts by weight slurry of carbon black pigment in butyl methacrylate was added at 0.004 parts by weight. This suspension was measured to have a viscosity of 860 cps, a density of 1.71 g/ml and a surface tension of 36.8 dyne/cm.

The matrix suspension was evacuated, then pumped into a mixing chamber where a slurry of 20 parts t-butyl peroxymaleic acid paste (Luperco PMA-25 as supplied by Atofina) was injected to the matrix at 1.7 parts by weight and also a slurry of 9 parts sodium metabisulfite, 68 parts dioctylterephthalate, 22 parts deionized water and 1% polyoxyethylene alkyl ether phosphate was injected at 1.64 parts by weight. The mixing residence time in the chamber was approximately two minutes.

The vein suspension was evacuated, then pumped into a mixing chamber where a slurry of 20 parts t-butyl peroxymaleic acid paste (Luperco PMA-25 as supplied by Atofina) was injected to the matrix at 1.2 parts by weight. The mixing residence time in the chamber was approximately two minutes.

The matrix suspension was introduced into a Vein Injector, comprised of a mixing chamber having an internal diameter of 2.5 centimeters and a length of 15 centimeters at a flow rate of 7200 cubic centimeters per minute. Two injector nozzles were placed at 90 degrees from each other in the same cross section of the mixing chamber, with each nozzle tip being 0.6 cm from the wall. Each nozzle had a circular outlet with a diameter of 0.6 centimeters. The total flow rate of the vein stream was 700 cubic centimeters per minute. The two suspensions were partially mixed in the mixing chamber after which they flowed through 2–3 meters of 2 cm tubing followed by laydown onto a moving support having a width of 84 centimeters.

At the end of the tubing before laydown are inserted various combinations of static mixing elements and a discharge nozzle, the configuration of which strongly affects the resulting pattern. In a preferred configuration, a conical slot nozzle was used in the end of the distribution hose. The circular slot has a slot opening of about 8 mm and a diameter of 40 mm.

This laydown combination is traversed across the moving support at a rate of approximately one sweep every four seconds. While sweeping across the support, the laydown mechanism is oscillated in the machine direction with an amplitude of about 15 cm and a frequency of about 4 cycles per traverse, and is also oscillated in the vertical direction above the support with approximately the same amplitude and frequency. This oscillation is done to help randomize the laydown pattern.

After laydown on the moving support, the partially mixed suspensions were subjected to a series of four temperature controlled zones. The first zone was 70 C. and the residence time was 6.7 minutes. The second zone was 80–90 C. and again had a residence time of 6.7 minutes. The third zone was 120 C. with 6.7 minutes residence, and the last zone was 110 C. with 6.7 minutes residence. After the last zone the suspensions had fully cured and provided a solid surface sample.

Sanding of 0.152 cm from each side of the sample revealed the pattern and yielded a product of 1.02 cm thickness. Light sanding of the solid surface sample demonstrated a series of aesthetically pleasing burls. A cross sector of the sample showed that the burls extended throughout interior portions of the material.

What is claimed is:

1. A continuous method of incorporating a burl appearance into solid surface material comprising the steps of:
    a) forming two separate acrylic resin suspension streams with a first stream having
        i) a viscosity in a range from 500 to 3,000 centipoise,
        ii) a density in a range from 1.5 to 1.7 grams per milliliter and
        iii) a surface tension in a range from 35 to 45 dyne per centimeter and a second stream having
        i) a viscosity in a range from 500 to 3,000 centipoise and
        ii) a density in a range from 1.6 to 1.8 gram per milliliter
        with the proviso that the second stream has a density of at least 0.05 gram per milliliter more than the first stream and the second stream has a surface tension of at least 0.5 dyne per centimeter greater than the first stream,
    b) continuously feeding one of the streams into a mixing chamber,
    c) continuously injecting the other stream into the stream within the mixing chamber wherein partial mixing takes place,
    d) flowing the partially mixed streams onto a support and
    e) curing the two suspensions whereby a series of three-dimensional burls are formed.

2. The method of claim 1 wherein the solid surface material contains different colors.

3. The method of claim 1 wherein the solid surface material contains a mineral filler which is selected from the group consisting of alumina, alumina trihydrate (ATH), alumina monohydrate, Bayer hydrate, silica, sand, glass, glass spheres, magnesium hydroxide, calcium sulfate, calcium carbonate, barium sulfate, ceramic particles, and a combination thereof.

4. The method of claim 1 wherein the solid surface contains an additive which is selected from the group consisting of brominated organic, carbon fiber, aramid fiber, and a combination thereof.

5. The method of claim 1 wherein the solid surface material contains different shades of the same color.

6. The method of claim 5 wherein the color is white.

7. The method of claim 5 wherein the color is brown.

* * * * *